United States Patent [19]

Bingham

[11] 4,133,938

[45] Jan. 9, 1979

[54] PRIMER COMPOSITIONS FOR SILICONE ELASTOMERS

[75] Inventor: Thomas G. Bingham, Tecumseh, Mich.

[73] Assignee: SWS Silicones Corporation, Adrian, Mich.

[21] Appl. No.: 790,219

[22] Filed: Apr. 15, 1977

Related U.S. Application Data

[63] Continuation of Ser. No. 619,081, Oct. 2, 1975, abandoned.

[51] Int. Cl.$^2$ .......................... B32B 13/04; C09J 5/04
[52] U.S. Cl. .............................. 428/447; 106/287.14; 156/314; 156/329; 260/448.8 R; 427/302; 427/407 R; 427/387
[58] Field of Search ............... 156/307, 315, 308, 329, 156/314, 332; 428/305, 447, 325, 448, 408, 454, 446, 538; 260/25, 827, 32.8 SB, 33.2 SB, 33.64 A, 46.54 A, 448.8 R, 46.5 G; 427/207, 387, 407 R, 302, 340, 333; 106/287 SB

[56] References Cited

U.S. PATENT DOCUMENTS

| | | | |
|---|---|---|---|
| 2,927,909 | 3/1960 | Lyons et al. | 106/287 SB |
| 2,979,420 | 4/1961 | Harper | 427/407 R |
| 3,240,736 | 3/1966 | Beckwith | 156/330 |
| 3,306,800 | 2/1967 | Plueddemann | 156/329 |
| 3,449,293 | 6/1969 | Burzynski et al. | 250/46.54 A |
| 3,505,099 | 4/1970 | Neuroth | 427/387 |
| 3,536,655 | 10/1970 | Burrill | 260/46.5 G |
| 3,567,493 | 3/1971 | Wessel | 427/387 |
| 3,706,697 | 12/1972 | Backderf | 260/827 |

OTHER PUBLICATIONS

Van Vlack, "Elements of Materials Science," Chapter 8, pp. 203–204, 1964.

*Primary Examiner*—John T. Goolkasian
*Assistant Examiner*—J. J. Gallagher

[57] ABSTRACT

Compositions that may be used as primers for bonding silicone elastomers to porous substrates which are obtained from the reaction of an acrylate and an acryloxyalkylakoxysilane in the presence of a free radical initiator and an organic solvent.

15 Claims, No Drawings

PRIMER COMPOSITIONS FOR SILICONE ELASTOMERS

This is a continuation, of application Ser. No. 619,081, filed Oct. 2, 1975, now abandoned.

The present invention relates to primer compositions and more particularly to primer compositions for bonding silicone elastomers to porous, nonmetallic substrates.

Heretofore, silicone elastomers have been bonded under heat and pressure to various substrates by coating the substrates with various silanes, such as alkyacyloxysilanes, alkyalkoxysilanes, alkoxyacyloxysilanes or vinyltriacyloxysilanes prior to the application of the silicone elastomer. Among the silanes which have been used as primers are tetraethoxysilane, t-butoxytriethoxsilane, methyltriethoxysilane, methyltriacetoxysilanes, ethyltriacetoxysilane, propyltriacetoxysilane, and the like.

Although the primers known heretofore exhibit good adhesion to metallic substrates, they do not exhibit good adhesive properties when applied to porous substrates which are subject to high humidity or where they are in direct contact with water.

Therefore, it is an object of this invention to provide unique primer compositions. Another object of this invention is to provide primer compositions for silicone elastomers. Still another object of this invention is to provide primer compositions which are resistant to water. A further object of this invention is to provide a method for bonding room temperature vulcanizable organopolysiloxanes to substrates which are in contact with water.

The foregoing objects and others which will become apparent from the following description are accomplished in accordance with this invention, generally speaking, by providing compositions which may be used for bonding silicone elastomers to porous nonmetallic substrates. These primer compositions are obtained by reacting an acrylate with an acryloxyalkylalkoxysilane in the presence of a free radical initiator and an organic solvent at a temperature of from about room temperature up to the reflux temperature of the solvent.

The acrylate or substituted acrylate which may be employed in this invention may be represented by the following formula

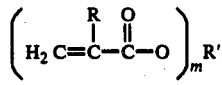

where R is a monovalent hydrocarbon radical having from one to ten carbon atoms or hydrogen, R' is a monovalent hydrocarbon radical or a divalent hydrocarbon radical having up to 10 carbon atoms and m is a number of from 1 to 4. When m is 1 then R' is a monovalent hydrocarbon radical and when m is 2 to 4, R' is a divalent hydrocarbon radical.

The acryloxyalkylalkoxysilane or substituted acryloxyalkylsilane employed in this invention may be represented by the following formula

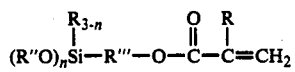

in which R is the same as above and R" is a monovalent hydrocarbon radical having from 1 to 10 carbon atoms, R'" is a divalent hydrocarbon radical having from 2 to 10 carbon atoms and n is a number of from 1 to 3.

Examples of suitable monovalent hydrocarbon radicals represented by R, R' and R" above are alkyl radicals such as methyl ethyl, propyl, butyl, pentyl, hexyl, octyl, and decyl; aryl radicals such as the phenyl and naphthyl radicals; alkaryl radicals such as tolyl, xylyl, cumenyl and ethylphenyl and aralkyl radicals such as benzyl, α-phenylethyl, B-phenylethyl, α-phenylbutyl and the like. Examples of suitable divalent hydrocarbon radicals represented by R' and R'" are ethylene, trimethylene, tetramethylene, hexylmethylene, octamethylene, and the like.

Examples of suitable acrylates which may be employed are methyl acrylate, ethyl acrylate, butyl acrylate, 2-ethylhexyl acrylate, methyl methacrylate, ethyl methacrylate, butyl methacrylate, isobutyl methacrylate, lauryl methacrylate, stearyl methacrylate, 1,3-butylene dimethylacrylate, and the like.

Suitable examples of polyfunctional acrylates, i.e., acrylates having at least two nonconjugated olefinic linkages are allyl methacrylate, allyl acrylate, methallyl acrylate, methallyl methacrylate, vinyl acrylate, vinyl methacrylate, ethylene dimethacrylate, tetramethylene diacrylate, 1,3-butylene dimethacrylate, and the like.

Examples of suitable acryloxyalkylalkoxysilanes which may be employed are methacryloxyethyltrimethoxysilane, methacryloxypropyltrimethoxysilane, methacryloxybutyltrimethoxysilane, methacryloxhexyltrimethoxysilane, methacryloxyethyltriethoxysilane, methacryloxyethyltributoxysilane, methacryloxyethyldimethoxybutoxysilane, methacryloxyethyldibutoxymethoxysilane and the like.

The compositions of this invention are prepared by reacting an acrylate or substituted acrylate with an acryloxyalkylalkoxysilane or substituted acryloxyalkylalkoxysilane in the presence of a free radical initiator and an organic solvent at a temperature of from about room temperature up to the reflux temperature of the solvent and more preferably at a temperature of from about 50° to 150° C.

Suitable free radical initiators which may be employed are organic peroxides and certain azo-compounds in which both the nitrogen atoms of the azo linkage are attached to a tertiary carbon atom and the remaining valences of the tertiary carbon atom are satisfied by nitrile, carboxy, cycloalkylene or alkyl radicals, preferable having from 1 to 18 carbon atoms.

Examples of suitable peroxide initiators are compounds of the formula $R_1OOH$, $R_1OOR_1$, $R_1COOOR_1$, or $(R_1COO)_2$ in which $R_1$ is an organic radical. Specific examples of peroxides which are operative in this invention are hydroperoxides such as t-butyl hydroperoxide, cumene hydroperoxide, and decalin hydroperoxide; dialkyl peroxides such as di-t-butyl and dicumyl peroxide; diacyl peroxides such as benzoyl peroxide; cyclic peroxides such as ascaridole; diperoxides such as 2,5-dimethyl-2,5-di-t-butyl peroxyhexane; peresters such as t-butyl perbenzoate, t-butylperoxy isopropyl carbonate and t-butyl peroctoate; keto peroxides such as acetone peroxide and cyclohexanone peroxides.

The amount of free radical initiator employed is not critical. Thus, any amount capable of producing a perceptible degree of fine radicals is suitable. Generally, amounts as low as 0.05 percent of the more reactive peroxide initiator based on the weight of the reactants is adequate in most cases. When the initiator is added in small increments, the total amount required may be as little as 0.01 percent based on the weight of the reactants, although amounts up to about 1 percent may be employed.

Under certain circumstances it may be desirable to dilute the initiator with an inert solvent especially when a normally solid initiator is employed. In such cases the concentration of initiator may be as low as 1 percent or less, but it is preferably in the range of from about 5 to about 20 percent. Any solvent with low chain transfer activity may be used. Examples of suitable solvents include benzene, toluene, xylene, chlorobenzene, cyclohexane, and ethyl acetate.

Several considerations determine the choice of temperature to be used in the reaction, although generally speaking, temperatures in the range of from room temperature up to the reflux temperature of the solvent and more preferable from about 50° to 150° will be found suitable.

For best results and convenient reaction times, the temperature and initiator should be chosen so that the half-life is between about 15 minutes and 10 hours and more preferably between about one hour and six hours. Table I shows the optimum temperature ranges for various free radical initiators.

TABLE I

| Initiator | Four-hour half-life Temperature, °C. | Preferred temperature range, °C. |
|---|---|---|
| 2,4-dichlorobenzoyl peroxide | 61 | 60-75 |
| Azobisisobutyronitrile | 73 | 70-85 |
| Benzoyl peroxide | 79 | 75-90 |
| t-butyl peroctoate | 80 | 75-90 |
| 1,1-di-t-butylperoxy-3,3,5-trimethylcyclohexane | 101 | 100-110 |
| t-butylperoxy isopropyl carbonate | 107 | 105-115 |
| t-butyl perbenzoate | 113 | 110-125 |
| Di-t-butyl peroxide | 135 | 130-145 |

Examples of suitable organic solvents which may be employed are aromatic hydrocarbons such as benzene, toluene, xylene, and the like; halogenated aromatic hydrocarbons such as chlorobenzene; aliphatic hydrocarbons such as pentane, hexane, octane, decane and halogenated aliphatic hydrocarbons such as methylene chloride, carbon tetrachloride, perchloroethylene and the like. Other organic solvents which may be employed are the ketones such as methyl ethyl ketone; esters such as ethyl acetate; ethers such as diethyl ether, dibutyl ether and the like. It is preferred that the solvent employed be sufficiently volatile to evaporate under the coating conditions.

The amount of acrylate and acryloxyalkylalkoxysilane employed in the primer composition is not critical and may range from a mol ratio of from 1 to 99 percent to 99 to 1 percent and more preferably from about 5 to 95 percent to 95 to 5 percent.

Surprisingly, it was found that the stability of the primer composition is substantially improved if one or more of the alkoxy groups of the acryloxyalkylalkoxysilane contain at least 3 carbon atoms.

It is preferred that the primer composition be applied as a solution which contains from about 5 to about 60 percent by weight of the product obtained from the reaction of the acrylate or substituted acrylate and the acryloxyalkylalkoxysilane or substituted acryloxyalkylalkoxysilane and more preferably from about 10 to about 50 percent by weight based on the total weight of the reaction product and the solvent. It has been found that with increased porosity of the substrate, a higher concentrated solution is necessary in order to provide good adhesion.

The primer compositions of this invention may be applied to any porous, nonmetallic substrate by spraying, dipping, brushing, wiping and the like and thereafter dried at any temperature from about room temperature up to the boiling point of the solvent. Where higher temperatures are used, the primer may be dried in about 10 seconds while lower temperatures may require relatively longer drying times.

These compositions may be applied as primers to any porous, nonmetallic substrates such as masonry materials. Other substrates which may be employed are carbon, plastic, ceramic, cellulosic materials, such as paper, wood and the like.

These compositions are primers for any one- or two-component organopolysiloxane compositions which are curable at ambient temperature.

Examples of suitable one component organopolysiloxane compositions are those which are endblocked with groups that are hydrolyzable in ambient moisture. These compositions may be represented by the general formula

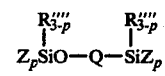

in which $R''''$ is a monovalent hydrocarbon radical or halogenated monovalent hydrocarbon radical having from 1 to 18 carbon atoms, or a cyanoalkyl radical, Q is a siloxane unit of the formula

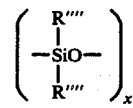

or a modified siloxane of the formula

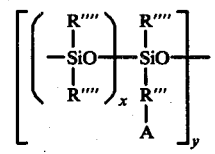

in which $R'''$ and $R''''$ are the same as above, A is a polymeric organic radical linked to $R'''$ by a carbon-to-carbon linkage, Z represents a hydroxyl group or a group hydrolyzable in ambient moisture, x is a number of from 0 to 20,000 and y is a number of from 1 to 500.

The modified organopolysiloxane is prepared by graft polymerizing an organopolysiloxane of the formula

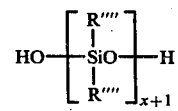

wherein $R''''$ and x are the same as above with a polymerizable organic monomer having aliphatic unsaturation in the presence of a free radical initiator. The modified organopolysiloxanes and their methods of preparation are described in U.S. Pat. Nos. 3,555,109, 3,627,836 and 3,776,875 to Getson; U.S. Pat. No. 3,631,087 to Lewis et al and U.S. Pat. No. 3,694,478 to Adams et al, which references are made a part of the disclosure of the present invention. These modified organopolysiloxanes consist of organopolysiloxane polymers having attached thereto at least one or more side chains or branches consisting of a carbon-to-carbon chain polymer. In the formation of these polymers, hydrogen is abstracted from the organopolysiloxane polymer by a free radical initiator to form an active site for grafting the organic monomer and/or polymer thereto.

Various cross-linking agents may be combined with the organopolysiloxane to form curable elastomers. Examples of suitable cross-linking agents are silanes and siloxanes containing at least three hydrolyzable groups as well as organohydrogenpolysiloxanes of the formula $$R''''_w HSiO_{\frac{3-4}{2}}$$

in which R'''' is the same as above and w is a number less than 2, but greater than zero.

A one-component room temperature vulcanizable composition may be prepared by mixing a hydroxyl-terminated organopolysiloxane or modified organopolysiloxane with a silane of the general formula $$X_{4-t}SiY_t$$

wherein X is a relative inert group such as an alkyl or aryl group; Y is a group hydrolyzable in ambient moisture, e.g., an acyloxy, oximo, alkoxy, aminoxy, amido, amino, halogen or phosphato group and t is a number of from 3 to 4.

Examples of suitable silanes are methyltriacetoxysilane, isopropoxytriacetoxysilane, methyltriacetoximosilane, methyltris(diethylphosphatos)silane and the like.

The silanes are added to the hydroxyl-terminated organopolysiloxanes and cured by merely exposing them to atmospheric moisture with or without any additional water vapor.

Generally, the amount of silane cross-linking agent may range from about 0.5 to about 10 percent and more preferably from about 1 to 5 percent by weight based on the weight of the organopolysiloxane.

In the two component system, hydroxyl terminated organopolysiloxanes or modified organopolysiloxanes are mixed with cross-linking agents such as polyalkoxysilanes of the formula $$(X'O)_z Si(Y')_{4-z}$$

or polyalkoxysiloxanes in which the silicon atoms are linked through Si-O-Si linkages and the remaining valences of the silicon atom are satisfied by X'O and/or Y' to form compositions which are curable at room temperature. In the above formula the groups represented by X' are monovalent hydrocarbon radicals having up to 8 carbon atoms while those represented by Y' are monovalent hydrocarbon radicals or halogenated monovalent hydrocarbon radicals having up to 8 carbon atoms and z has a value of from 3 to 4.

Examples of suitable monovalent hydrocarbon radicals represented by X' are methyl, ethyl propyl, butyl, hexyl, octyl, phenyl, vinyl, allyl, ethylallyl, and the like. Radicals represented by Y' may be the same as the radicals represented by X' above as well as the corresponding halogenated groups such as chloromethyl, 2-bromo-4,6-diiodophenyl, 1,2-fluorovinyl, 6-chlorohexyl and the like. The polyalkoxysilanes used herein include monoorganotrihydrocarbonoxy silanes, tetrahydrocarbonoxy silanes and partial hydrolysates thereof. Examples of suitable polyalkoxy compounds are alkyl silicates, polysilicates or partially hydrolyzed silicates, such as ethylsilicate "40". Other cross-linking agents are ethyl trimethoxysilane, methylbutoxydiethoxysilane, propyltripropoxysilane, methyltriethoxysilane, ethyltriethoxysilane, tetraethylorthosilicate and n-butyl orthosilicate. Example of alkyl polysilicates are ethylpolysilicates, isopropylpolysilicates, butylpolysilicates; siloxanes such as dimethyltetraethoxydisiloxane, trimethylpentabutoxydisiloxane, trimethylpentabutoxytrisiloxane and the like.

The polyalkoxysilanes and polyalkoxysiloxanes employed herein may be used either alone or in combination. They should be used in an amount of from about 0.5 to about 20 percent or more preferably from about 1 to 10 percent by weight based on the weight of the organopolysiloxane.

The two-component organopolysiloxane compositions are cured by mixing the hydroxyl-terminated organopolysiloxanes with the polyalkoxysilane or polyalkoxysiloxane cross-linking agents in the presence of a curing catalyst. Examples of suitable catalysts are metallic salts of carboxylic acids, in which the metals are lead, tin, zirconium, iron, cadmium, titanium, calcium and maganese. It is preferred that the carboxylic acid salts of the above metals be characterized by the properties that the carboxylic acid radical contain up to 18 carbon atoms and more preferably up to about 16 carbon atoms. Likewise, it is preferred that the salts be soluble in the organopolysiloxane.

Examples of suitable matallic salts are tin naphthenate, leat octoate, tin octoate, iron stearate, tin oleate, antimony octoate, tin butyrate and the like. Other tin catalysts which may be employed include dibutyltin butoxychloride, dibutyltin dilaurate, bis-(dibutylphenyltin)oxide, bis-(acetoxdibutyltin)oxide, bis(tributyltin)oxide, dibutoxydibutyltin, t-butyltin hydroxide, triethyltin hydroxide, diamyldipropoxytin, dioctyltin dilaurate, diphenyloctyltin acetate, dodecyldiethyltin acetate, trioctyltin acetate, triphenyltin acetate, tridecyltin laurate and the like. These catalysts may be dispersed in a solvent and then added to the hydroxyl-terminated organopolysiloxane composition or they may be dispersed in a suitable filler or additive and thereafter milled with the organopolysiloxane composition.

Examples of suitable hydrocarbon solvents which may be employed to disperse the catalysts are benzene, toluene, xylene and the like. Also, halogenated hydrocarbons such a tetrachloroethylene or chlorobenzene; organic ethers such as diethyl ether, dibutyl ether and hydroxyl free fluid polysiloxanes may be used as solvents. It is preferred that the solvent be sufficiently volatile to evaporate off at room temperature.

The amount of catalyst used in these curing systems may range from about 0.05 to about 2 percent by weight and more preferably from about 0.1 to about 1 percent by weight based on the weight of the composition. A mixture of two or more of the catalysts mentioned above may be used, if desired.

Although not essential, fillers may be incorporated in these curable organopolysiloxane compositions to further improve the physical properties for some commercial applications. Examples of suitable fillers are fumed silicas, high surface area precipitated silicas, silica aerogels as well as coarser silicas such as diatomaceous earth, crushed quartz and the like. Other fillers which may be used are metallic oxides such as titanium oxide, ferric oxide, zinc oxide; fibrous fillers such as asbestos, fibrous glass and the like. Other additives such as pigments, antioxidants, ultraviolet absorbers and the like may be included in these compositions.

This invention can be used to produce a wide range of products including silicone rubber coated substrates which may be used as dampers in sonar devices and as protective coatings where silicone rubber is applied to plastic sheets and films. In addition porous substrates such as masonry and cellulosic materials may be coated with silicone rubber and subjected to a water environment and still maintain its adhesive properties.

The embodiments of this invention are further illustrated by the following examples which all parts are be weight unless otherwise specified.

EXAMPLE 1

A composition is prepared by adding over a period of about 6 hours a mixture containing 9.7 parts of methacryloxypropyltrimethoxysilane, 81 parts of ethyl acrylate and 1.2 parts of di-t-butylperoxide to a reactor containing 90 toluene heated to reflux temperature and thereafter refluxed for an additional hour. An opaque viscous product is obtained which is brush applied to a porous masonry substrate and dried at room temperature.

A room temperature vulcanizable organopolysiloxane composition containing 100 parts of a hydroxyl terminated dimethylpolysiloxane having a viscosity of about 4000 cs. at 25° C., 5 parts of methyltriacetoxysilane and 8 parts of Cab-O-Sil is applied to the dried substrate and cured in the presence of atmospheric moisture for 48 hours. The coated masonry substrate is then immersed in water for 7 days, after which the bond is tested by trying to remove the silicone elastomer from the primed substrate. Excellent adhesion between the silicone elastomer and the masonry substrate is observed.

EXAMPLE 2

Four primer compositions are prepared in accordance with the procedure of Example 1 in which 13 parts of methacryloxypropyltrimethoxysilane are reacted with 48 parts of ethyl methacrylate in the presence of di-t-butylperoxide and varying amounts of toluene. The resultant compositions are each applied as a film to porous masonry substrates, dried and thereafter the room temperature vulcanizable organopolysiloxane composition described in Example 1 is applied thereto. The coated masonry substrates are each immersed in water for 7 days after which the bond is tested by trying to remove the silicone rubber from the primed substrate. The results of these tests are illustrated in the following table as Examples 2(a) to 2(d).

In a comparative test a porous masonry substrate is treated with a composition containing 30 parts of vinyltriacetoxysilane and 70 parts of toluene, dried and thereafter the room temperature vulcanizable organopolysiloxane composition described in Example 1 is applied thereto. The coated masonry substrate is immersed in water for 7 days after which the bond is tested by trying to remove the silicone rubber from the primed substrate. The results are illustrated in Table II as Example 2(e).

In another comparative test a porous masonry substrate is coated with a composition containing 30 parts of vinyltriethoxysilane and 70 parts of toluene, dried and thereafter the room temperature vulcanizable organopolysiloxane composition described in Example 1 is applied thereto. After curing for 48 hours at room temperature the coated masonry substrate is immersed in water for 7 days after which the bond is tested in accordance with the procedure described above. The result is illustrated in Table II as Example 2(f).

In a similar test, the room temperature vulcanizable organopolysiloxane composition described in Example 1 is applied to an unprimed porous masonry substrate. After curing for 48 hours at room temperature the coated substrate is immersed in water for 7 days after which the bond is tested by removing the rubber from the primed substrate. The result is illustrated in Table II as Example 2(g).

TABLE II

| Example No. | Ethyl Methylacrylate, Parts | Methacryloxy Propyltrimethoxysilane, Parts | Toluene, Parts | Adhesion |
| --- | --- | --- | --- | --- |
| 2(a) | 48 | 13 | 122 | Excellent |
| 2(b) | 48 | 13 | 244 | Good |
| 2(c) | 48 | 13 | 549 | Fair |
| 2(d) | 48 | 13 | 1159 | Poor |
| Comparison Examples | | | | |
| 2(e) | 30* | 0 | 70 | None |
| 2(f) | 30** | 0 | 70 | None |
| 2(g) | 0 | 0 | 0 | None |

*vinyltriacetoxysilane
**vinyltriethoxysilane

EXAMPLE 3

A composition prepared in accordance with Example 2(a) is applied to a porous masonry substrate and dried. A room temperature vulcanizable organopolysiloxane composition which is prepared by mixing 100 parts of a hydroxyl-terminated dimethylpolysiloxane having a viscosity of about 10,000 cs. at 25° C. with 8 parts of methyltris(cyclohexylamino)silane, 50 parts of a trimethylsiloxy endblocked dimethylpolysiloxane having a viscosity of 50 cs. at 25° C. and 17 parts of diatomaceous earth is applied to the coated masonry substrate and exposed to atmospheric moisture for 48 hours. The coated substrate is then immersed in water for 7 days after which the bond is tested by removing the rubber from the primed substrate. Excellent adhesion between the silicone elastomer and substrate is observed.

EXAMPLE 4

A primer composition is prepared by adding a mixture containing 62 parts of butyl acrylate, 13 parts of methacryloxypropyltrimethoxysilane and 0.7 part of di-t-butylperoxide to a reactor containing 75 parts of toluene. The reaction mass is heated to reflux temperature and maintained at this temperature for 6 hours. The resultant product is cooled to room temperature after which 100 parts of toluene are added. The product is then applied by brushing onto a porous masonry substrate and dried at room temperature. The room temperature vulcanizable organopolysiloxane composition described in Example 1 is applied thereto and cured at room temperature for 48 hours. The coated masonry substrate is immersed in water for 7 days after which the bond between the primed substrate and the silicone elastomer is tested. Good adhesion between the silicone rubber and the primed substrate is observed.

EXAMPLE 5

A primer composition is prepared in accordance with Example 4, except that 100 parts of tetramethylene diacrylate is substituted for the butyl acrylate and 190 parts of tolune are employed. The reaction product is applied to a concrete substrate and dried. The room temperature vulcanizable organopolysiloxane composition of Example 1 is applied to the coated substrate and cured at room temperature. The coated substrate is immersed in water for 7 days, after which time the adhesive bond is determined. Excellent adhesion between the silicone rubber and the coated substrate is observed.

EXAMPLE 6

(a) A modified organopolysiloxane composition is prepared by heating a mixture containing 80 parts of a hydroxyl-terminated dimethylpolysiloxane (400 cs. at 25° C.), 54 parts of butyl acrylate and 66 parts of styrene to 150° C. with agitation. A solution containing 0.4 part of t-butylperbenzoate in 6 parts of toluene is added in increments of 0.3 part at intervals of 20 minutes. When the addition is complete, the reaction mass is heated at 150° C. for an additional 30 minutes.

About 100 parts of the modified organopolysiloxane prepared above is mixed with 5 parts of ethyl silicate "40" and 0.5 part of dibutyltin butoxychloride and applied to a porous substrate coated with the composition of Example 1 and dried. The modified organopolysiloxane composition is cured at room temperature for 48 hours and then immersed in water for 7 days. Excellent adhesion between the modified organopolysiloxane composition and the porous substrate is observed.

(b) The procedure of Example 6 (a) is repeated except that a room temperature curable organopolysiloxane composition containing 5 parts of methyltriacetoxysilane, about 100 parts of the modified organopolysiloxane prepared in accordance with Example 6 (a) and about 8 parts of Cab-O-Sil is applied to the coated substrate. The organopolysiloxane composition is cured for 48 hours after which time the coated substrate is immersed in water for 7 days.

Excellent adhesion between the silicone elastomer and the porous substrate is observed.

EXAMPLE 7

A porous masonry substrate is primed with the composition of Example 1, dried and thereafter a room temperature vulcanizable organopolysiloxane composition containing 5 parts of ethyl silicate "40", about 100 parts of a hydroxyl-terminated dimethylpolysiloxane having a viscosity of about 2000 cs. at 25° C., about 0.5 part of dibutyltin dilaurate and 60 parts of iron oxide is applied thereto.

The room temperature vulcanizable organopolysiloxane composition is cured at room temperature for 48 hours, after which time the masonry substrate is immersed in water for 7 days. Excellent adhesion between the silicone rubber and the primed substrate is observed.

EXAMPLE 8

In a comparative test, a composition is prepared by adding dropwise over a period of 30 minutes a mixture containing 90 parts of methacryloxypropyltrimethoxysilane and 0.9 part of di-tertiary butyl peroxide to a reactor containing 180 parts of toluene at reflux temperature. The reactants are refluxed for an additional 5 hours, cooled and then applied to a concrete substrate. After drying overnight, the room temperature vulcanizable composition prepared in accordance with Example 1 is applied and cured in the presence of atmospheric moisture for 48 hours. The coated substrate is then immersed in water for 7 days, after which time the adhesive bond between the silicone elastomer and the primed substrate is determined. Only slight adhesion between the silicone elastomer and the primed substrate is observed.

EXAMPLE 9

In a comparison test, a composition is prepared by refluxing 50 parts of ethyl methacrylate, 0.5 part of tertiary butylperoxy isopropyl carbonate and 100 parts of toluene in a reactor for about 6.5 hours. The reaction mass is cooled and applied to a concrete substrate. After drying, a room temperature vulcanizable composition prepared in accordance with Example 1 is applied to the dried substrate and cured in the presence of atmospheric moisture for 48 hours. The coated substrate is immersed in water for 7 days, after which time the adhesive bond between the silicone elastomer and the primed substrate is determined. No adhesion between the silicone elastomer and the primed substrate is observed.

EXAMPLE 10

When room temperature vulcanizable silicone elastomers are applied to other substrates such as wood, vinyl, ceramic and carbon black surfaces that have been primed with the primer composition of Example 1, excellent adhesion of the silicone elastomers is observed even after being immersed in water for several days.

It is to be understood that this invention is not limited to the specific examples set forth herein and that modifications may be made without departure from the spirit and scope of the appended claims.

What is claimed is:

1. A method for bonding a room temperature vulcanizable organopolysiloxane composition to a porous masonry substrate which bonded composite will be in contact with water which comprises applying to the masonry substrate a solution consisting essentially of a product obtained from the reaction of an acrylate and an acryloxyalkylalkoxysilane in the presence of a free radical initiator and an organic solvent, evaporating off the solvent and thereafter applying a room temperature vulcanizable modified organopolysiloxane composition to the dried substrate, said room temperature vulcanizable modified organopolysiloxane composition is obtained from the polymerization of an organopolysiloxane of the formula

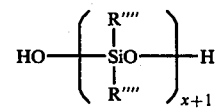

in which R"" is selected from the class consisting of monovalent hydrocarbon radicals, halogenated monovalent hydrocarbon radicals having from 1 to 18 carbon atoms and a cyanoalkyl radical and x is a number of from 0 to 20,000, with a polymerizable organic monomer having aliphatic unsaturation in the presence of a free radical initiator and thereafter adding a cross-linking agent to the modified organopolysiloxane.

2. The method of claim 1 wherein the reaction is conducted at a temperature such that the free radical initiator has a half-life of about 4 hours.

3. The method of claim 1 wherein the free radical initiator is an organic peroxide.

4. The method of claim 1 wherein the solution contains from 50 to 60 percent by weight of the product obtained from the reaction of the acrylate and the acryloxyalkylalkoxysilane based on the total weight of the solvent and the product.

5. The method of claim 1 wherein the acrylate is an alkyl acrylate.

6. The method of claim 1 wherein the acryloxyalkylalkoxysilane is methacryloxyalkyltrialkoxysilane.

7. The method of claim 6 wherein the methacryloxyalkyltrialkoxysilane is methacryloxypropyltrimethoxysilane.

8. The method of claim 1 wherein the acrylate is ethyl acrylate and the acryloxyalkylalkoxysilane is methacryloxypropyltrimethoxysilane.

9. The method of claim 1 wherein the organic solvent is a halogenated organic solvent.

10. The method of claim 1 wherein the cross-linking agent is a silane of the formula $$X_{4-t}SiY_t$$

in which X is selected from the class consisting of an alkyl and aryl group, Y is a hydrolyzable group and t is a number of from 3 to 4.

11. The method of claim 10 wherein the cross-linking agent is present in an amount of from 0.5 to 10 percent by weight based on the weight of the organopolysiloxane.

12. The method of claim 1 wherein the cross-linking agent is selected from the class consisting of polyalkoxysilanes and polyalkoxysiloxanes and further contains a curing catalyst.

13. The method of claim 12 wherein the cross-linking agent is present in an amount of from 0.5 to 20 percent by weight based on the weight of the organopolysiloxane.

14. The bonded composite which is obtained in accordance with the method of claim 10.

15. The bonded composite which is obtained in accordance with the method of claim 12.

* * * * *